(12) United States Patent
Soumpholphakdy et al.

(10) Patent No.: US 12,079,072 B2
(45) Date of Patent: Sep. 3, 2024

(54) ORCHESTRATION OF AUTOMATED VIRTUAL MACHINE FAILURE REPLACEMENT IN A NODE CLUSTER

(71) Applicant: Dell Products L.P., Round Rock, TX (US)

(72) Inventors: Steven Soumpholphakdy, Chicago, IL (US); Ryan Libby, Seattle, WA (US); David T. Leimbach, Mechanicsburg, PA (US); Ray Ramsden, Seattle, WA (US); Zhao Lijun, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 41 days.

(21) Appl. No.: 18/157,353

(22) Filed: Jan. 20, 2023

(65) Prior Publication Data

US 2024/0248788 A1     Jul. 25, 2024

(51) Int. Cl.
*G06F 11/07*     (2006.01)
*G06F 9/455*     (2018.01)
*G06F 11/30*     (2006.01)

(52) U.S. Cl.
CPC ...... *G06F 11/0793* (2013.01); *G06F 9/45533* (2013.01); *G06F 11/301* (2013.01); *G06F 2209/5011* (2013.01)

(58) Field of Classification Search
CPC .............. G06F 11/0793; G06F 11/301; G06F 9/45533; G06F 2209/5011
See application file for complete search history.

(56) References Cited

U.S. PATENT DOCUMENTS

| 2011/0231696 | A1* | 9/2011 | Ji | G06F 9/45558 718/1 |
| 2013/0332921 | A1* | 12/2013 | Khutornenko | G06F 9/45533 718/1 |

\* cited by examiner

*Primary Examiner* — Matthew M Kim
*Assistant Examiner* — Matthew N Putaraksa
(74) *Attorney, Agent, or Firm* — Amin, Turocy & Watson, LLP

(57) ABSTRACT

The technology described herein is directed towards automating the replacement of a virtual machine when the hardware underlying the virtual machine fails, including in a cloud computing environment in which nodes in a cluster map to virtual machines being deployed within that cloud provider. An automated workflow to perform cluster self-healing is started upon detection of an unrecoverable instance failure of a virtual machine, e.g., because of underlying hardware failure. The failed virtual machine is terminated, and a new, replacement virtual machine that matches characteristics of the failed virtual machine is created to join the cluster. Data of the failed node is re-protected, such as by restoring data maintained with a protection scheme to remaining virtual machines of the cluster. When the data is re-protected and the replacement virtual machine has joined the cluster, the data is rebalanced across the cluster nodes, including to the new virtual machine.

20 Claims, 10 Drawing Sheets

ORCHESTRATION OF AUTOMATED VIRTUAL MACHINE FAILURE REPLACEMENT IN A NODE CLUSTER

BACKGROUND

In cloud-based computing, nodes in a cluster map to virtual machines being deployed within that cloud provider. A node/virtual machine can experience a non-recoverable failure, such as when the underlying hardware fails (e.g., a motherboard failure).

Virtual machines in the cloud tend to be less reliable, based on higher annualized failure, than on-premise appliance solutions. As a result, there are numerous support cases related to cloud-based virtual machine failures and the need for replacements. Virtual machine failures can cause user data to be vulnerable to data loss from further failures, and often result in support tickets, causing the end-user to endure working in a degraded state for an undesirable amount of time, as well as being expensive to resolve.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
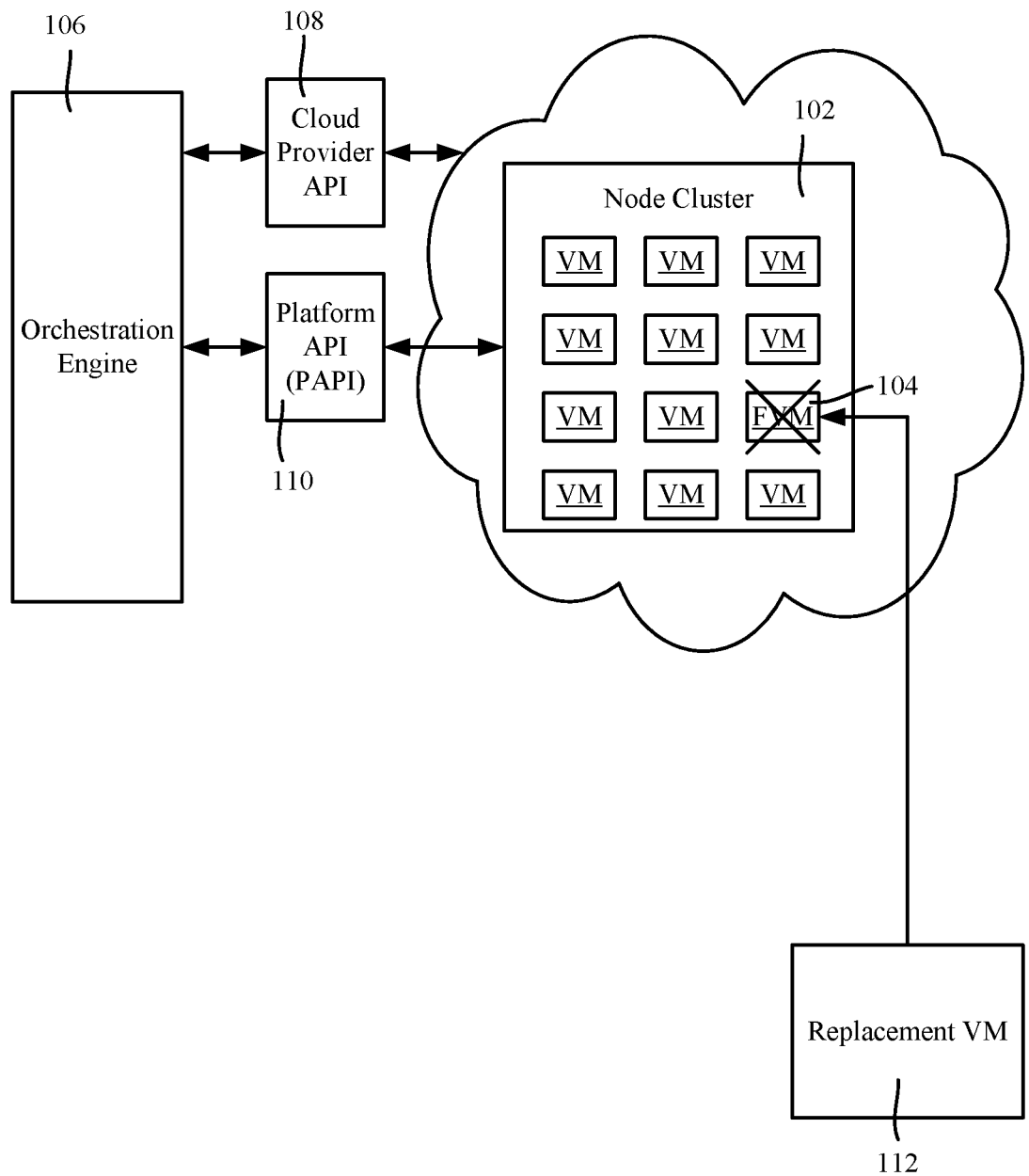
FIG. 1 is a block diagram representation of a system/architecture of a cluster of virtual machines in a cloud environment coupled to an orchestration component that automates replacement of a virtual machine with a non-recoverable failure, in accordance with various aspects and implementations of the subject disclosure.

Various aspects of the technology described herein are generally directed towards automated virtual machine failure replacement in a node cluster, such as when a virtual machine fails due to a non-recoverable failure on the underlying virtual machine hardware. When a virtual machine in a node cluster fails and the storage system/platform determines the virtual machine will not recover (e.g., such as because of a motherboard failure), an orchestration engine starts a virtual machine replacement process.

In one or more implementations as described herein, the virtual machine replacement process is managed by an orchestration engine, which triggers various operations and jobs, including termination of the failed virtual machine, creation of a replacement virtual machine. This can result in starting a data protection job (e.g., triggered internally by the cluster operating system) to restore the level of protection of data that, because of the failure has reduced protection, and when restored and the replacement virtual machine is verified as ready, starting a data rebalancing job to move data from the other virtual machines/nodes of the cluster to the new virtual machine. For as-a-service solutions, such as cloud services, the orchestration engine is responsible for the automation of the virtual machine replacement process. For users in other scenarios such as self-deployment scenarios, a generally similar process can be orchestrated by scripts.

It should be understood that any of the examples herein are non-limiting. As one example, the technology is described in a cloud platform/distributed file system/node cluster environment, however this is only an example and can be implemented in similar environments, including those not yet implemented. Further, the failure of one virtual machine is described, however the technology described herein can be used for automatically recovering from multiple virtual machine failures. Thus, any of the embodiments, aspects, concepts, structures, functionalities or examples described herein are non-limiting, and the technology may be used in various ways that provide benefits and advantages in data storage and computing in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a cloud environment hosting a node cluster 102 comprising a number of virtual machines (VMs) arranged to store data among the nodes/virtual machines a distributed file system manner; (twelve VMs are shown in this example, although any practical number may be present). In general, data in a distributed storage system is distributed across storage units of the cluster, along with error-correction information, which ensures that the data remains intact and accessible even in the event of component failures. That is, under normal operating conditions, the data is protected against one or more failures of a node or drive. Note that upon failure, the cluster protection status is considered to be in a degraded state until the data is re-protected, which is performed by rebuilding data in the free space of the remaining cluster storage.

In the example of FIG. 1, one of the virtual machines has experienced a non-recoverable failure, e.g., caused by failure of its underlying hardware, and is labeled FVM 104 and depicted as crossed-out with an "x" in FIG. 1. As described herein with respect to replacement of the failed machine 104, whereby the protection status no longer in the degraded state, an orchestration engine 106 manages the replacement. As described herein, the orchestration engine 106 is coupled to the cloud provider via an API 108, and to the node cluster 102 via a platform API (PAPI) 110, and executes a process that coordinates various jobs and other operations (e.g., self-initiated data reprotection and data rebalancing by the node cluster 102 as described herein with respect to one example implementation) to automate the replacement of the failed virtual machine with a replacement virtual machine 112.

Figure 2:
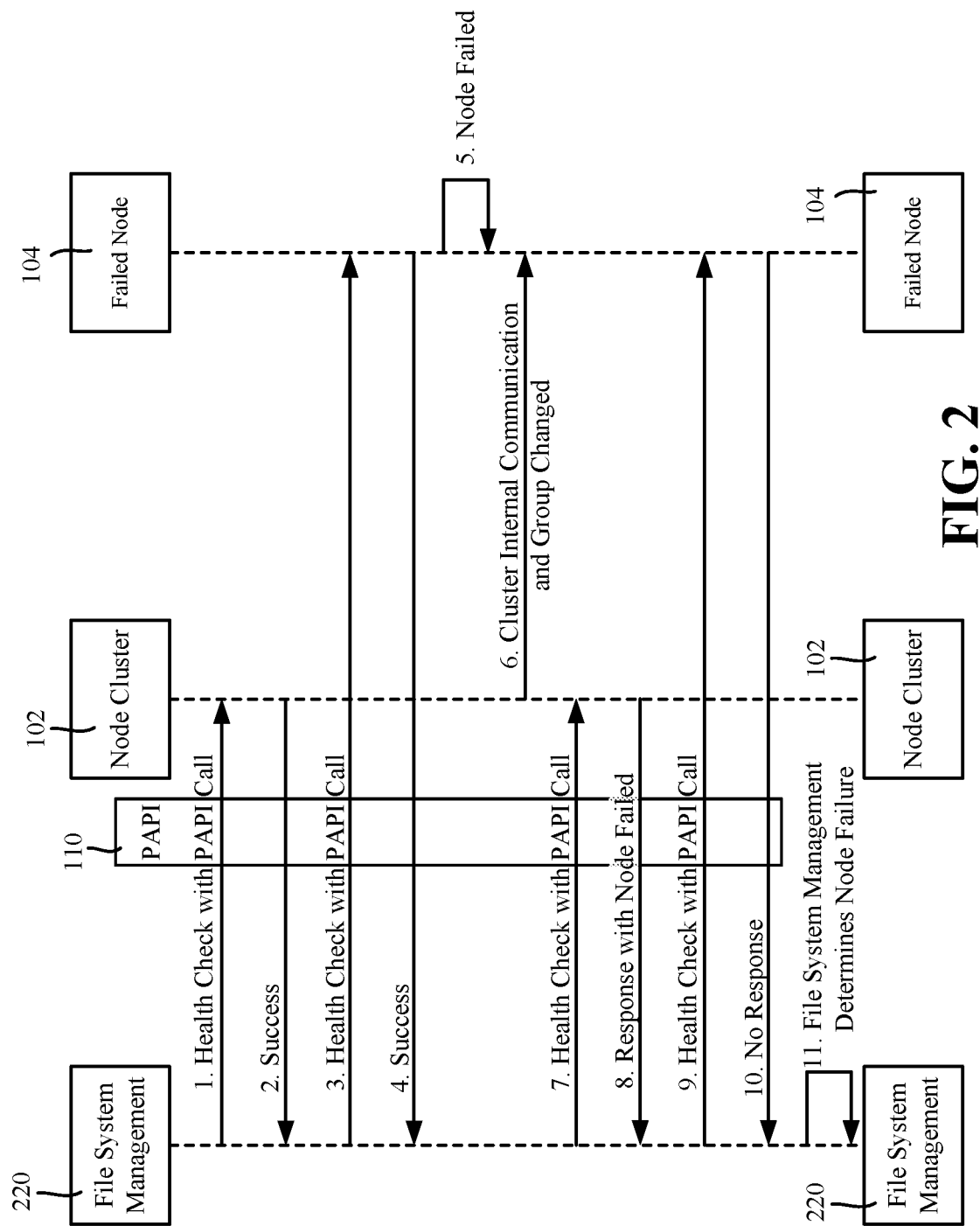
FIG. 2 is an example component and signaling diagram showing example dataflow sequences related to detection of a virtual machine, within a node cluster, that has experienced a non-recoverable failure, in accordance with various aspects and implementations of the subject disclosure.

As generally shown in FIG. 2, file system management 220 (e.g., part of Dell EMC® OneFS operating/file system) expects the cloud-computing platform along with the orchestration engine 106 to detect hardware failure events (e.g., power loss and network interface failure), and determine whether or not the failed instance will be back. Based on a non-recoverable failure, the orchestration engine 106 will take proper actions to replace a failed virtual machine/node, as described herein.

The file system management 220 provides the ability, including via the orchestration engine 106, to monitor the health of the cluster. This helps the orchestration engine 106 to take proper action on those unplanned events which the cloud-computing platform/the orchestration engine 106 cannot detect. This can include, for example, journal device failure; (in a journaled file system, each node contains a non-volatile memory that is used for journaling to ensure that writes are safe across power failures; however, journal device failure happens, such as if the underlying device fails or the journal contents are otherwise lost).

The file system management 220 provides the PAPI interface 110 for querying, e.g., periodically, the cluster's health status, as represented in FIG. 2 via the labeled arrows one (1) (query) and two (2) (success reply). In one implementation, the query reply includes the nodes' statuses. The file system management 220 or orchestration engine 106, via the PAPI interface 110, can also query an individual node (as represented in FIG. 2 via the labeled arrows three (3) (query) and four (4) (success reply).

At some point, a node in the cluster will fail, often (but not necessarily) due to some underlying hardware failure (arrow five (5)). When this occurs, the rest of the cluster detects (arrow six (6)), that node as down, and replies to the next health check query (arrow seven (7)) with a node down/node failed status arrow eight (8)). It should be noted, however, that detection of a node failure can be a result of the cloud provider API 108 (FIG. 3) telling the orchestration engine 106 (e.g., via a notification to or in response to a query from the orchestration engine 106) of a node failure, regardless of any underlying hardware failure; for example a virtual machine can be declared permanently unavailable (that is, a non-recoverable failure) for any arbitrary reason.

Thus, the file system management 220/orchestration engine 106 can check the cluster's health status. When a node is found to be down through the health check reply, an extra health check on the node is made arrow nine (9) (query); "arrow" ten (10) represents no response, e.g., after a suitable timeout period. When this occurs, the file system management 220/orchestration engine 106 determines (arrow eleven (11)) a failure event and kicks off the unplanned maintenance workflow (FIGS. 3-5) according to characteristics of the event.

Thus, when the orchestration engine 106 determines an instance failure has occurred, whatever the cause (journal failure, network interface failure, etc.) the orchestration engine 106 does not expect the instance to come back. As described herein, for such an instance failure the orchestration engine 106 kicks off the instance failure workflow of FIGS. 3-5.

Figure 3:
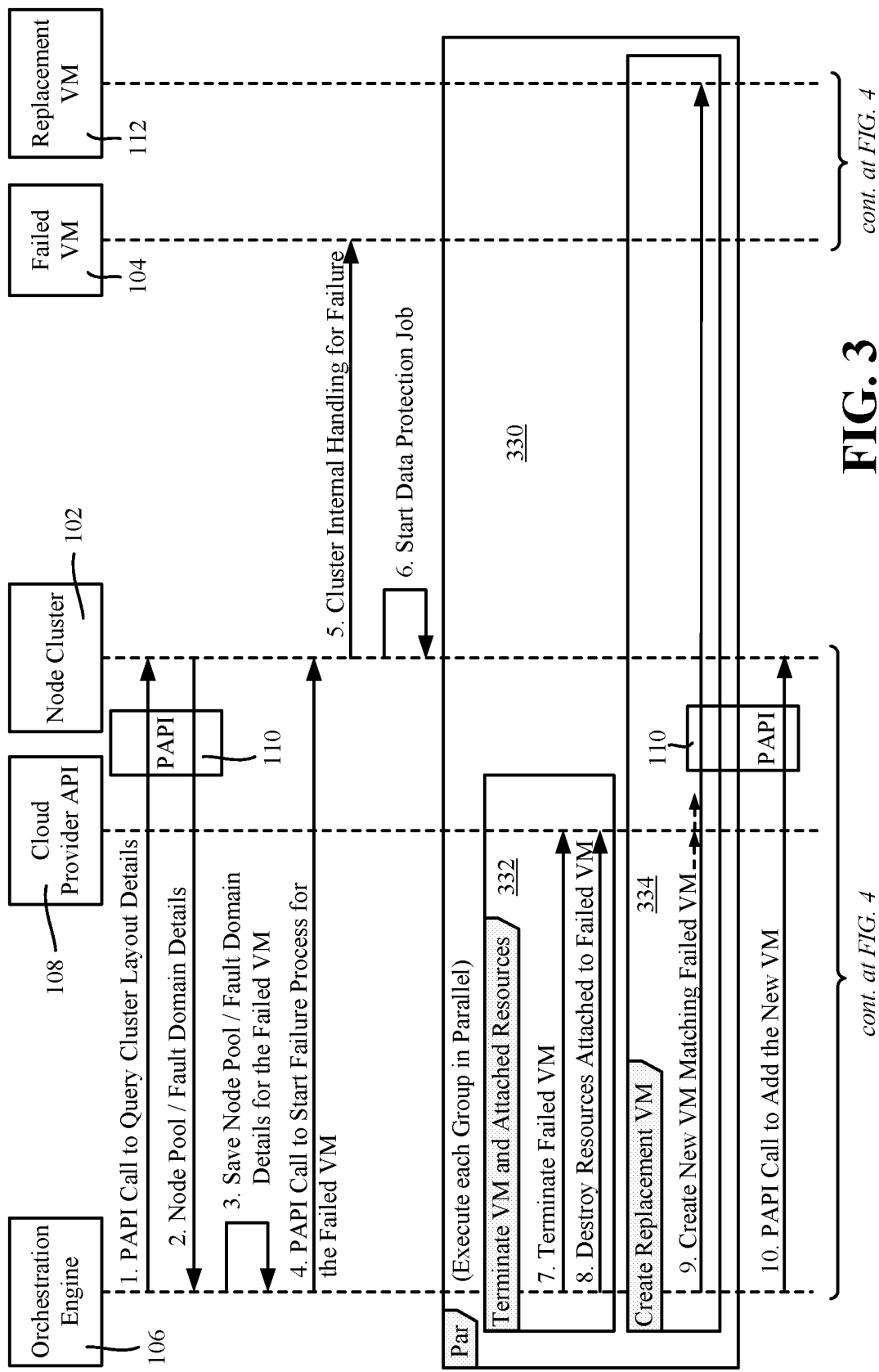
FIGS. 3-5 comprises an example component and signaling diagram showing example dataflow sequences of a workflow related to automatic, automated virtual machine failure replacement orchestration in a node cluster, in accordance with various aspects and implementations of the subject disclosure.
Figure 4:
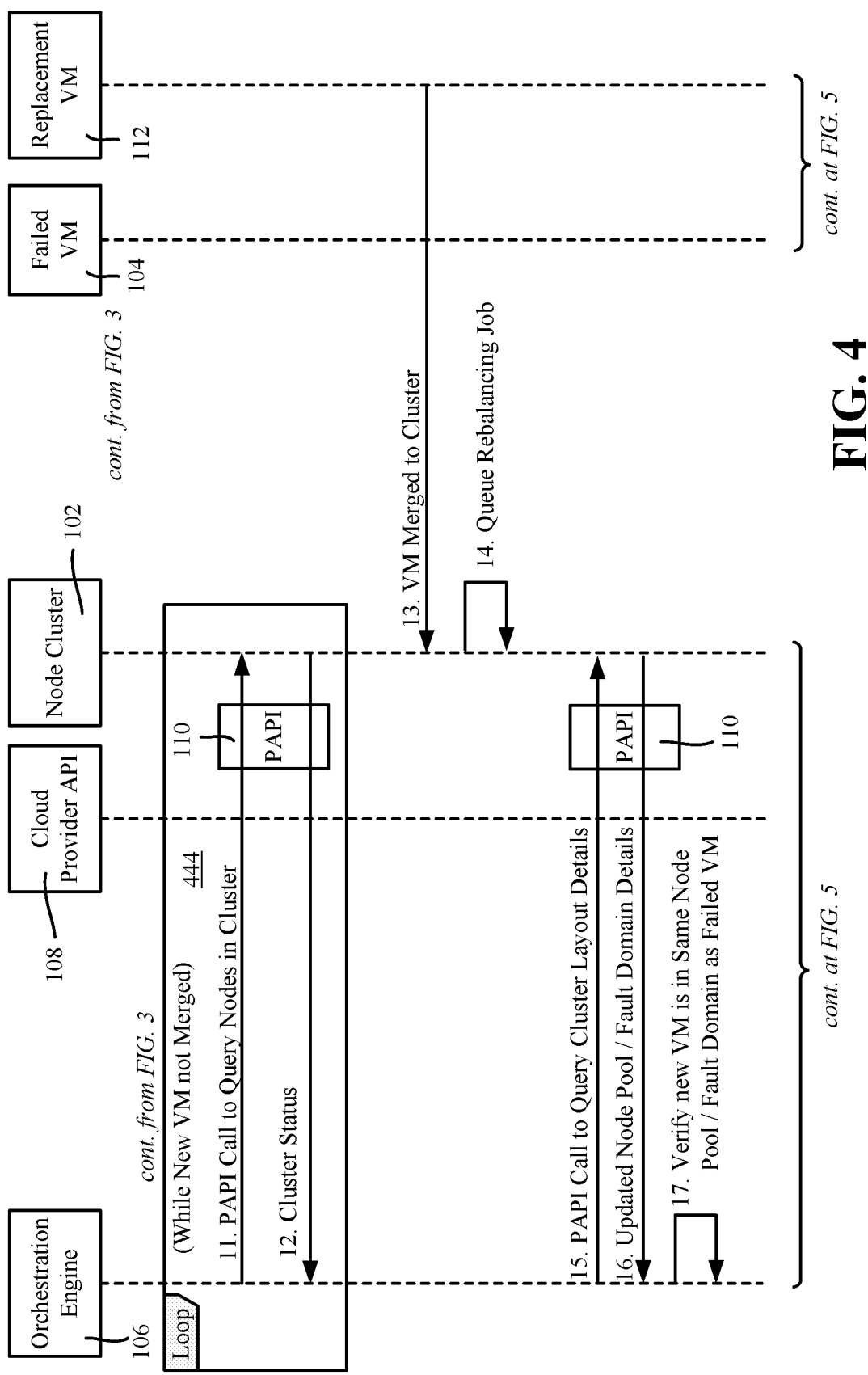
Figure 5:
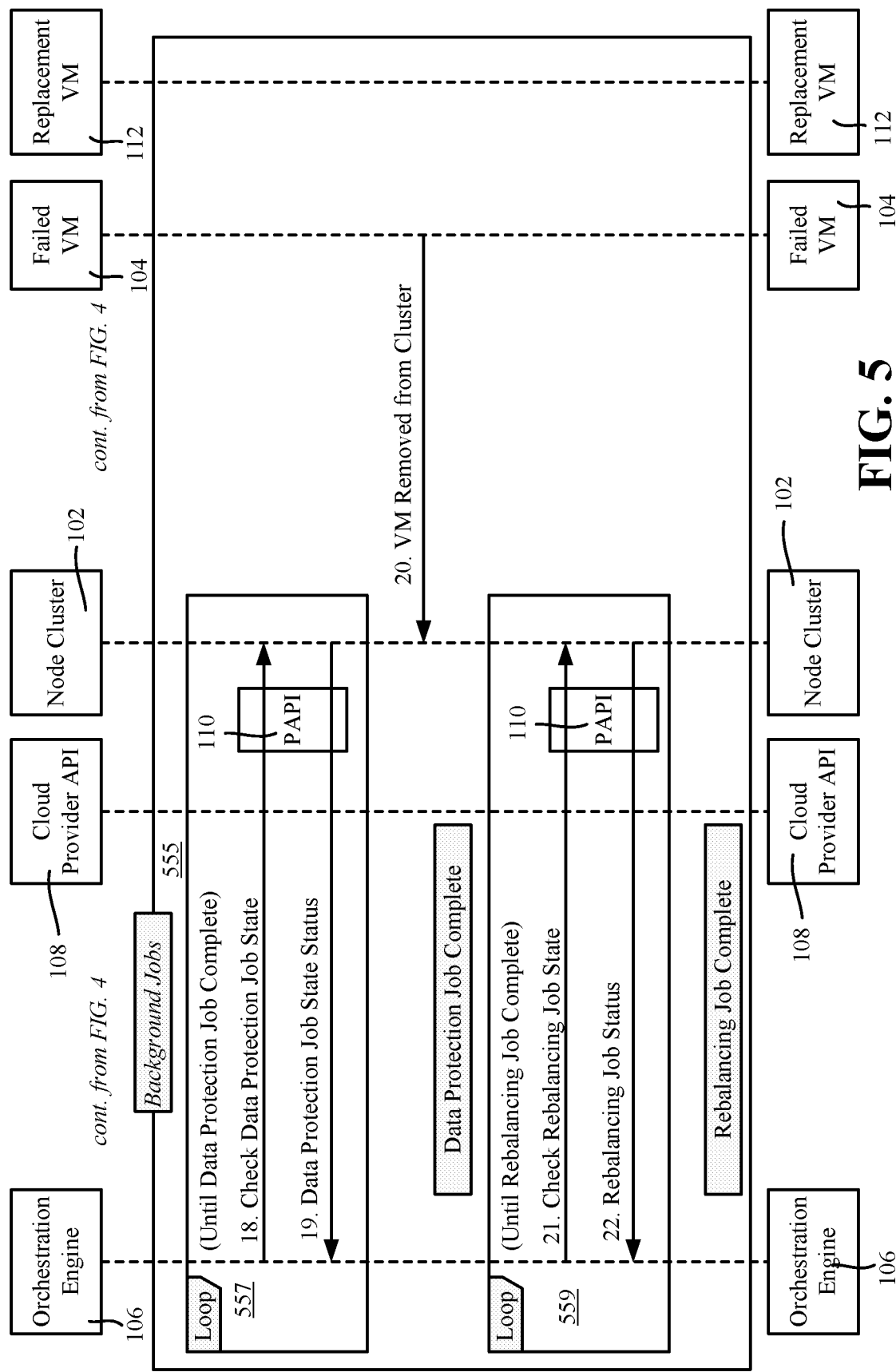

For an instance failure, the solution is to replace the failed instance with a new instance. FIGS. 3-5 depict an example of the unplanned maintenance workflow.

In one implementation, a step in the overall replacement process/workflow determines to which node pool the virtual machine belongs, which is used to verify the replacement. That is, the replacement node is to be used in the same pool of storage as the failed node, rather than being used as free space in another pool of storage. Note that in general, a node pool is a group of nodes within a cluster that have the same configuration, e.g., groups of disk pools spread across similar, or compatible, storage nodes. Note that there also can be system-defined fault domains within a node pool used in the dynamic data protection scheme; (units of data protection generally do not cross fault domain boundaries). A device failure primarily affects particular fault domain(s), and indeed, the replacement device is not only a replacement to restore decreased cluster capacity but also to replace the role of the device in its fault domain. By choosing to provision the replacement device as a replacement in the particular fault domain(s), the system enables the protection job and the rebalance job to do a minimum amount of work. This information is available via a PAPI query for the cluster layout details, as represented in FIG. 3 by arrows one (1) and two (2) of FIG. 3, with the result saved for subsequent verification (arrow three (3)). In general, via the response, the orchestration engine 106 obtains the node pool identifier (e.g., a number) of every node, including the node pool identifier of the failed node.

As represented in FIG. 3 by arrow four (4), the orchestration engine 106 initiates an intelligent failure recovery process for the failed virtual machine via the PAPI interface 110 to the cluster 102. This results in the cluster 102 performing internal failure handling as represented by arrow five (5), which includes automatically triggering a data protection job (arrow six (6)). The data protection job can run in the background.

It should be noted that in one implementation, this triggering of the data protection job (e.g., by the node cluster operating system in response to actions by the workflow) need not add capacity to replace capacity that was lost, as the data protection job instead restores the level of protection that is temporarily reduced resulting from the lost storage via the data protection scheme. This is because data is maintained with error correction protection data, with storage organized in such a way that the data with reduced protection is re-protected as efficiently as possible. Via the data protection job, data with reduced protection (but still protected) is rebuilt in the free space of the cluster, whereby the cluster does not require a dedicated hot-spare node or drive in order to recover from a component failure; (although such hot-spare solutions are feasible in alternative storage systems). Thus, in most instances there is no need for hot spare storage, because disk drive failures are far more frequent than node failures, and there is ordinarily sufficient free space reserved for data reprotection resulting from a failed drive, which (along with speed) are among the reasons for orchestrating the replacement.

In one implementation, two sets of subsequent operations can be executed in parallel (block 330 of FIG. 3). This includes arrows seven (7) and eight (8) of block 332, in which the orchestration engine 106 terminates the failed instance and releases its resources, respectively. Terminating the virtual machine is done by calling the appropriate cloud provider API 108. Additional resources attached to the virtual machine are to be destroyed as part of this step.

As also shown in FIG. 3 via block 334 and arrow nine (9), the orchestration engine 106 spins up a new instance in parallel; note that as shown via the dashed arrows parallel to the arrow nine (9), in one implementation this is performed by the orchestration engine 106 instructing the cloud provider API 108 to create the replacement VM 112, with the cloud provider API 108 acting on the orchestration engine's behalf. The new instance has instance attributes that match the failed instance, such as region, zone, machine image, security group, subnet, etc., and in particular shares the same instance type, volume type, and volume configuration. One difference is the serial number which is assigned to the virtual machine; the orchestration engine 106 generates new serial number for the new instance, and the serial number is provided via additional orchestration-specified data when starting the virtual machine, for example.

Arrow ten (10), the orchestration engine 106 calls PAPI interface to add the new instance (e.g., lazy join) to the cluster. Starting the replacement virtual machine 112 is done by calling the appropriate cloud provider API. The system ensures that the replacement virtual machine 112 is started with the same image as the target cluster, has performance characteristics (e.g., instance SKU) match that of the failed virtual machine, and that the attached resources, such as volume type and capacity, match that of the failed virtual machine. As part of starting the replacement virtual machine 112, the orchestration engine 106 passes additional information to the replacement virtual machine 112, using the appropriate API parameter, to ensure the virtual machine can properly bootstrap itself during boot. After the replacement virtual machine has been started, the orchestration engine 106 can call a network-attached storage platform "add-node" API with the replacement virtual machine's serial number with the async flag set to true. Using the async flag adds the serial number of the replacement virtual machine to a join queue, such that it will automatically be added to the cluster.

Block 444 of FIG. 4 includes arrows eleven (11) and twelve (12), which are looped (e.g., periodically or occasionally) to check the status of the nodes in the cluster, waiting for the replacement virtual machine 112 to be merged. Merge is completed by the cluster as represented by arrow thirteen (13), reported by the cluster to the orchestration engine via an iteration of arrows eleven (11) and twelve (12). The cluster also queues a rebalancing job (arrow fourteen (14)) as described below.

The underlying provisioning logic is supposed to place the replacement virtual machine 112 into the same node pool (and the same fault domain if appropriate) as the failed virtual machine 104, including by determining node compatibility and thus eligibility to replace the failed node. Note that some non-limiting example attributes for determining node compatibility and thus node pool membership (for a replacement node to be placed in the same node pool as the failed node) can include volume type, instance type, and volume configuration; some or all of these and/or other attributes can be similarly used.

Once the replacement virtual machine has joined and merged with the cluster, the orchestration engine 106 validates that the replacement virtual machine was placed in the same node pool (and fault domain if appropriate) as the failed virtual machine (arrows fifteen (15) through seventeen (17)).

As set forth above, restoring protection via the data protection job was started as a background job (block 555) as soon as the failed virtual machine has been failed. Another background job is data rebalancing, however restoring protection has higher priority than rebalancing, and thus the data protection job runs to completion and rebalancing remains queued arrow fourteen (14)) until completed. Block 557 of FIG. 5, represents a loop for checking the data protection job status via queries/responses arrows (arrows eighteen (18) and nineteen (19)) until the returned data protection job status indicates completed, at which time the cluster is no longer operating in the degraded state with respect to reduced data protection.

Once completed, arrow twenty (20) represents the failed node being removed from the cluster 102, and the queued data rebalancing job begins.

In general, the data rebalancing job moves some of the cluster's data to the newly joined virtual machine 112. This is done in an organized way to distribute the data in a protected way until complete. Block 559 of FIG. 5, represents a loop for checking the data rebalancing job status via queries/responses arrows (arrows twenty-one (21) and twenty-two (22)) until the returned rebalancing job status indicates completed. When both jobs have been completed successfully, the virtual machine replacement process is complete.

Figure 6:
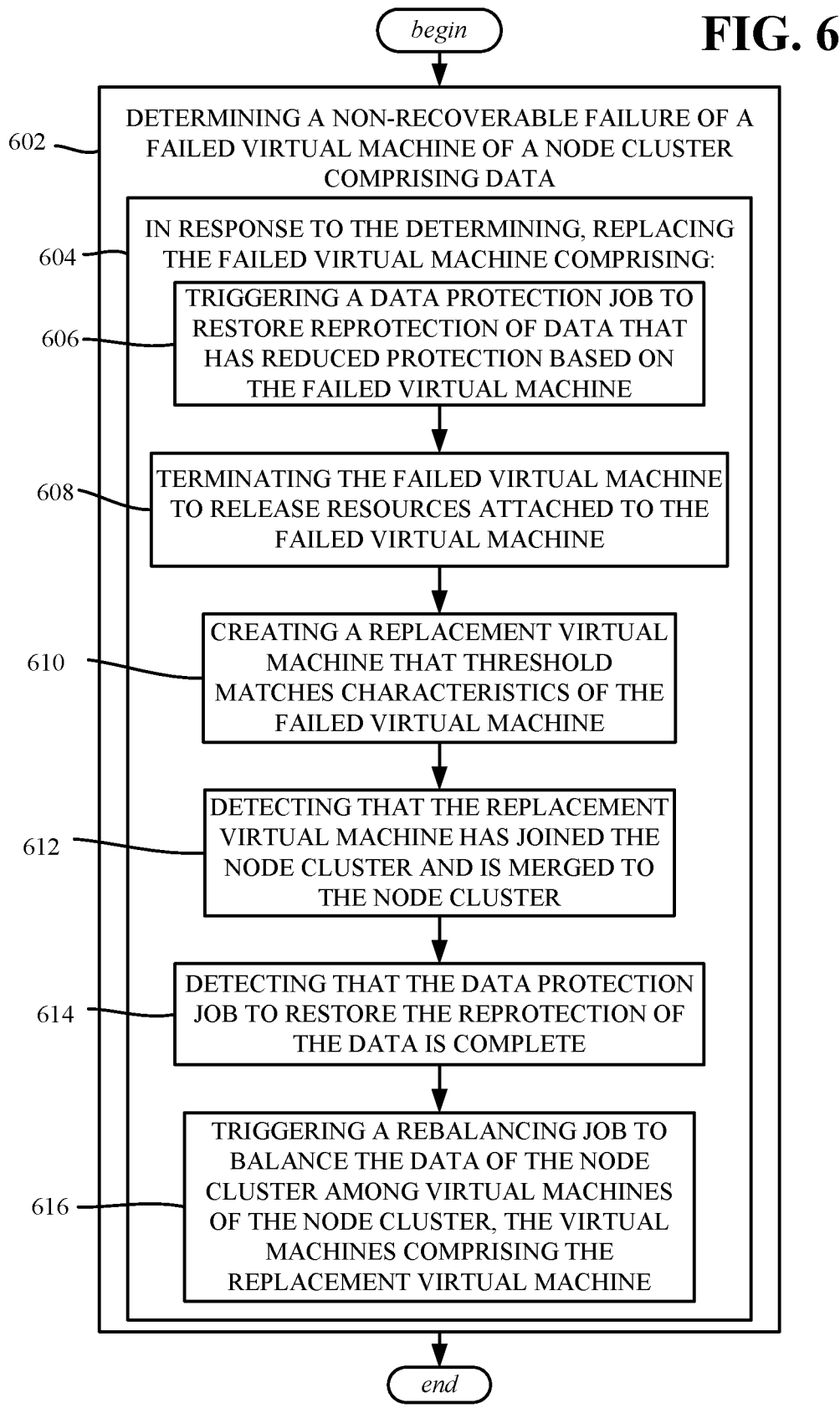
FIG. 6 is a flow diagram showing example operations related to replacing a failed virtual machine via automated operations, in accordance with various aspects and implementations of the subject disclosure.

One or more aspects can be embodied in network equipment, such as represented in the example operations of FIG. 6, and for example can include a memory that stores computer executable components and/or operations, and a processor that executes computer executable components and/or operations stored in the memory. Example operations can include operation 602, which represents determining a non-recoverable failure of a failed virtual machine of a node cluster comprising data. Example operations can include operation 604 which, in response to the determining, represents replacing the failed virtual machine, which can include operations 606-618. Example operation 606 represents triggering a data protection job to restore reprotection of data that has reduced protection based on the failed virtual machine. Example operation 608 represents terminating the failed virtual machine to release resources attached to the failed virtual machine. Example operation 610 represents creating a replacement virtual machine that threshold matches characteristics of the failed virtual machine. Example operation 612 represents detecting that the replacement virtual machine has joined the node cluster and is merged to the node cluster. Example operation 614 represents detecting that the data protection job to restore the reprotection of the data is complete. Example operation 616 represents triggering a rebalancing job to balance the data of the node cluster among virtual machines of the node cluster, the virtual machines comprising the replacement virtual machine.

Terminating the failed virtual machine and creating the replacement virtual machine can include facilitating the terminating and the creating via cloud network equipment associated with a cloud provider.

Further operations can include queuing the data protection job prior to triggering the rebalancing job.

Triggering the data protection job can occur prior to the terminating of the failed virtual machine.

Triggering the rebalancing job can occur in response to the detecting that the replacement virtual machine is merged into the node cluster.

Creating the replacement virtual machine that threshold matches the characteristics of the failed virtual machine can include determining at least one of: a node pool to which the failed virtual machine belonged, or a fault domain to which the failed virtual machine belonged. Further operations further comprise verifying at least one of: that the replacement virtual machine belongs to the node pool, or that the fault domain matches the fault domain of the failed virtual machine.

Determining the non-recoverable failure can include detecting at least one of: a hardware failure of a device underlying the virtual machine, or a journal device failure.

Replacing the failed virtual machine can be performed using an orchestration engine communicatively coupled to the node cluster.

Determining the non-recoverable failure of the failed virtual machine of the node cluster can include obtaining data indicating the non-recoverable failure of the failed virtual machine corresponding to a health check of the node cluster.

Creating of the replacement virtual machine can include adding a serial number of the replacement virtual machine to a node cluster join queue.

Further operations can include obtaining cluster status data representative of a status of the node cluster, and wherein the obtaining of the cluster status data, the terminating of the failed virtual machine, and the creating of the replacement virtual machine are performed in parallel or substantially in parallel.

Figure 7:
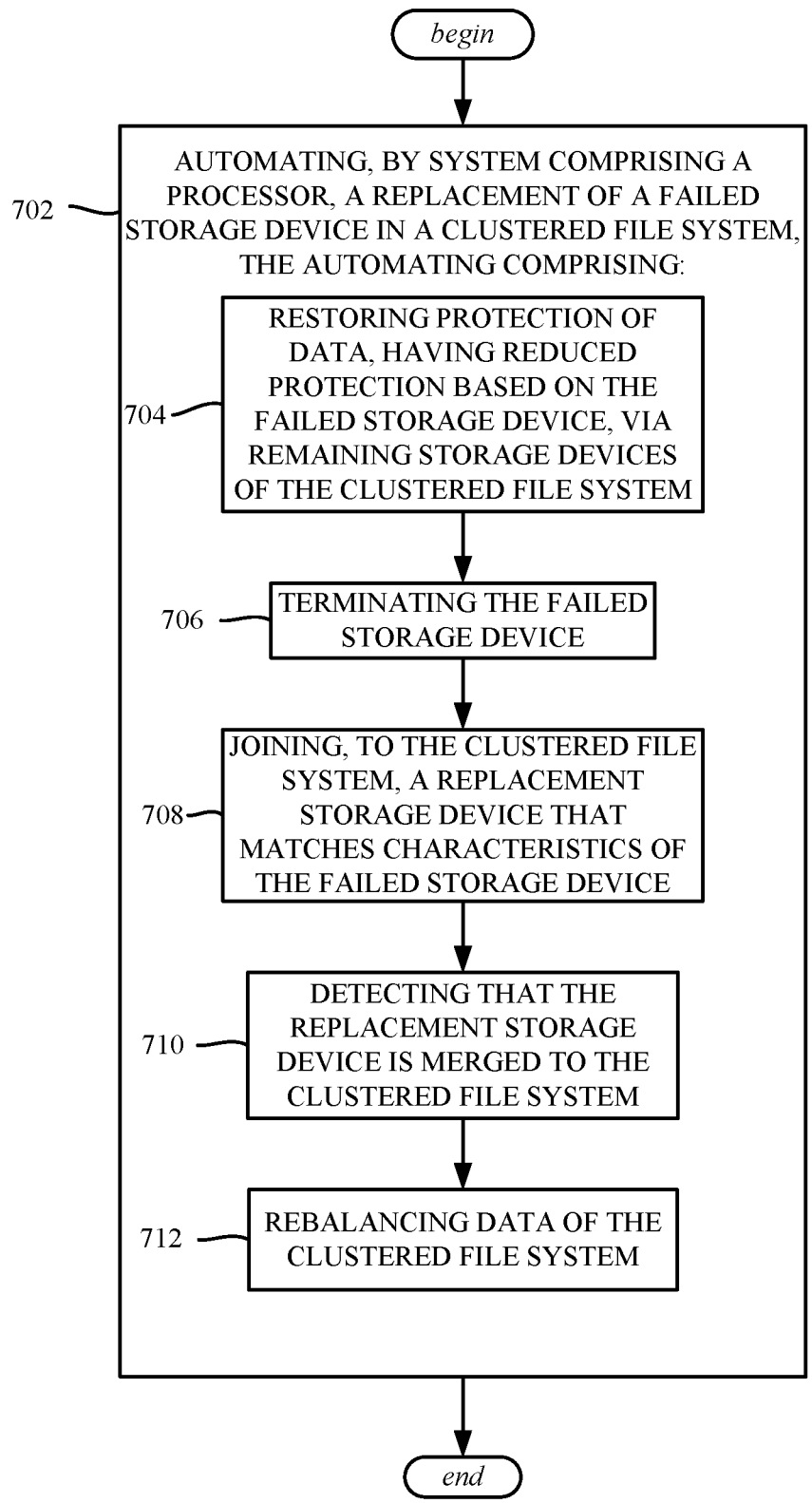
FIG. 7 is a flow diagram showing example operations related to automating replacement of a failed node in a clustered file system, in accordance with various aspects and implementations of the subject disclosure.

One or more example aspects, such as corresponding to example operations of a method, are represented in FIG. 7. Example operation 702 represents automating, by system comprising a processor, a replacement of a failed storage device in a clustered file system. The automating can include restoring protection of data, having reduced protection based on the failed storage device, via remaining storage devices of the clustered file system (example operation 704), terminating the failed storage device (example operation 706), joining, to the clustered file system, a replacement storage device that matches characteristics of the failed storage device, (example operation 708), detecting that the replacement storage device is merged to the clustered file system (example operation 710), and rebalancing data of the clustered file system (example operation 712).

Rebalancing the data of the clustered file system can include queueing a rebalancing job, determining completion of the restoring of the protection of the data, and running the rebalancing job in response to the determining of the completion of the restoring of the protection.

Automating further can include creating the replacement storage device with characteristic data that matches characteristic data representative of at least one characteristic of the failed storage device.

Automating further can include determining a storage device pool of the clustered file system and a fault domain of the clustered file system to which the failed storage device belonged, and verifying that the replacement storage device is in the storage device pool and the fault domain.

Automating can include executing an orchestration engine, or executing a script to perform at least one of the restoring, the terminating, the joining, the detecting, or the rebalancing.

The replacement storage device corresponds to a virtual machine, and the joining of the replacement storage device can include adding a serial number of the virtual machine to a storage device cluster join queue applicable to joining the clustered file system.

Figure 8:
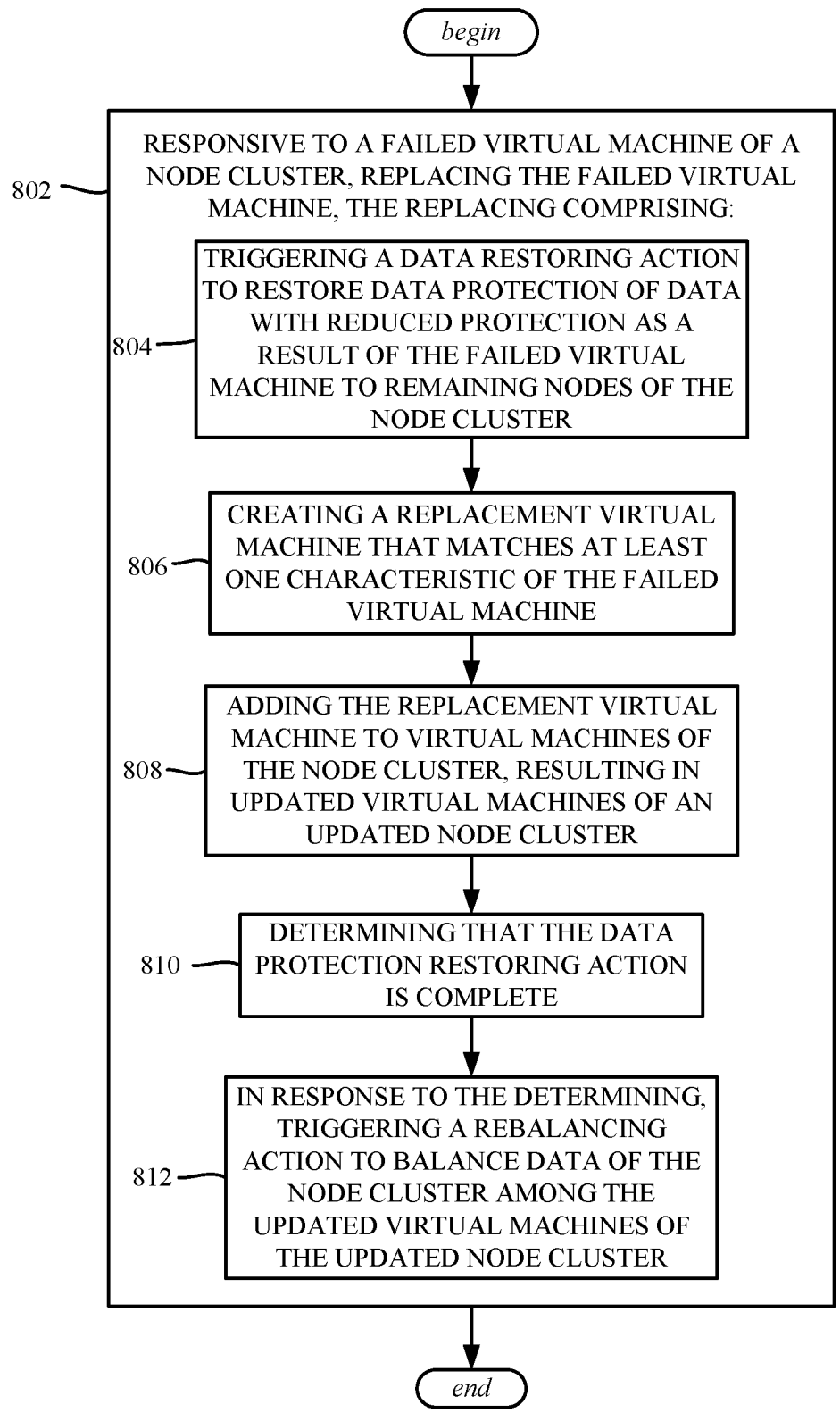
FIG. 8 is a flow diagram showing example operations related to replacing a failed virtual machine via various automated operations, in accordance with various aspects and implementations of the subject disclosure.

FIG. 8 summarizes various example operations, e.g., corresponding to a machine-readable medium, comprising executable instructions that, when executed by a processor, facilitate performance of operations. Example operation 802 represents, responsive to a failed virtual machine of a node cluster, replacing the failed virtual machine, the replacing comprising example operations 804-812. Example operation 804 represents triggering a data restoring action to restore data protection of data with reduced protection as a result of the failed virtual machine to remaining nodes of the node cluster. Example operation 806 represents creating a replacement virtual machine that matches at least one characteristic of the failed virtual machine. Example operation 808 represents adding the replacement virtual machine to virtual machines of the node cluster, resulting in updated virtual machines of an updated node cluster. Example operation 810 represents determining that the data protection restoring action is complete. Example operation 812 represents, in response to the determining, triggering a rebalancing action to balance data of the node cluster among the updated virtual machines of the updated node cluster.

Adding the replacement virtual machine can include taking an action to join the replacement virtual machine to the node cluster, resulting in the replacement virtual machine being merged to the node cluster.

As can be seen, the technology described herein facilitates moving data storage systems and platforms into virtualized environments, providing self-healing capabilities as described herein. The described workflow facilitates automating the replacement of a node in a scale-out, virtualized, clustered filesystem. Orchestrating the replacement of a failed node is advantageous compared to other replacement methods in the cloud. For example, other replacement methods involve restarting the virtual machine, re-using the operating system disk and attaching the data drives to a virtual machine on a different physical host; however this would fail to boot due to a blown journal and would lead to a support ticket, with the virtual machine held until the problem is resolved, which is costly. By automating the replacement process via the technology described herein, lost storage is restored efficiently, frequently avoiding the opening of unnecessary support tickets, while reducing the amount of time the end-user ends up in a degraded state and providing zero additional cost self-healing. Moreover, reliability is increased, as increasing speed of reprotection (by limiting the work needed) reduces the window of risk during which another failure could occur and result in data loss.

Figure 9:
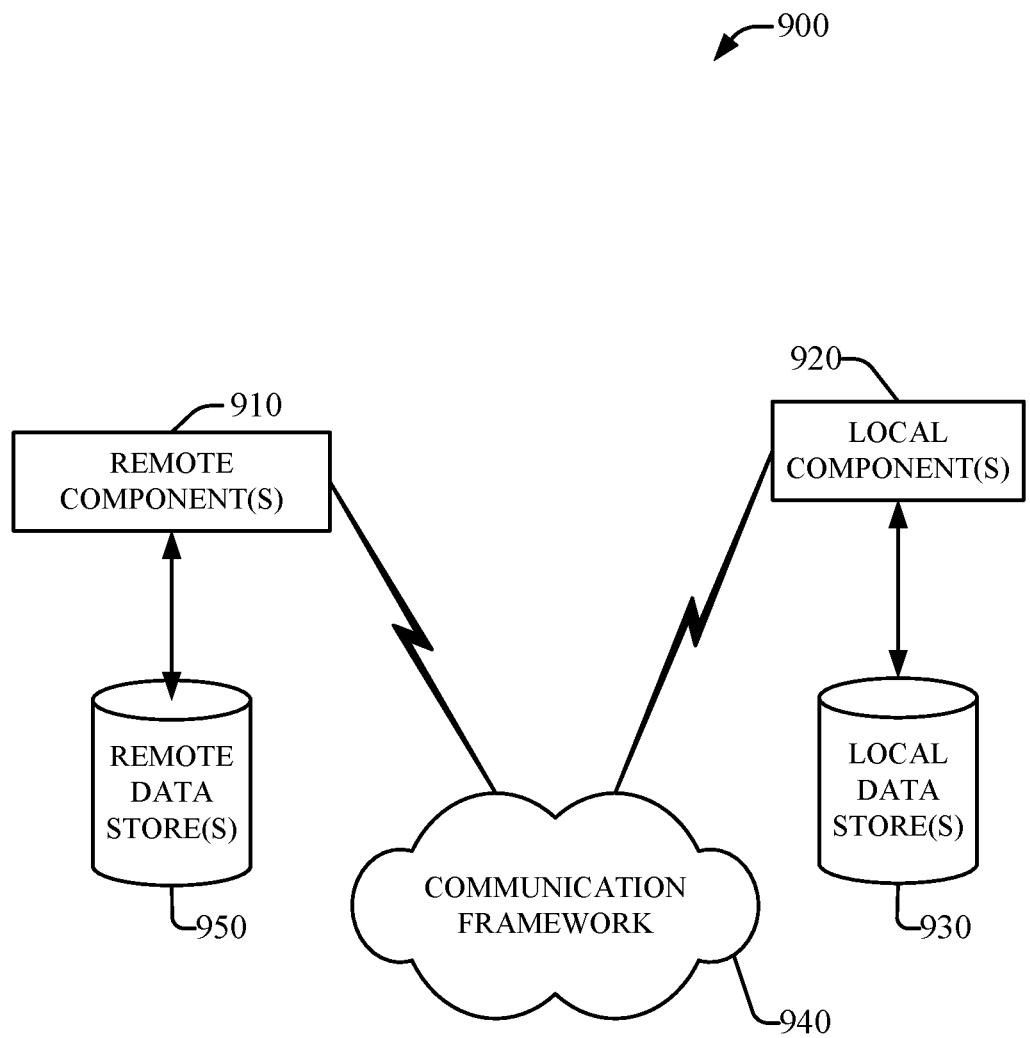
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
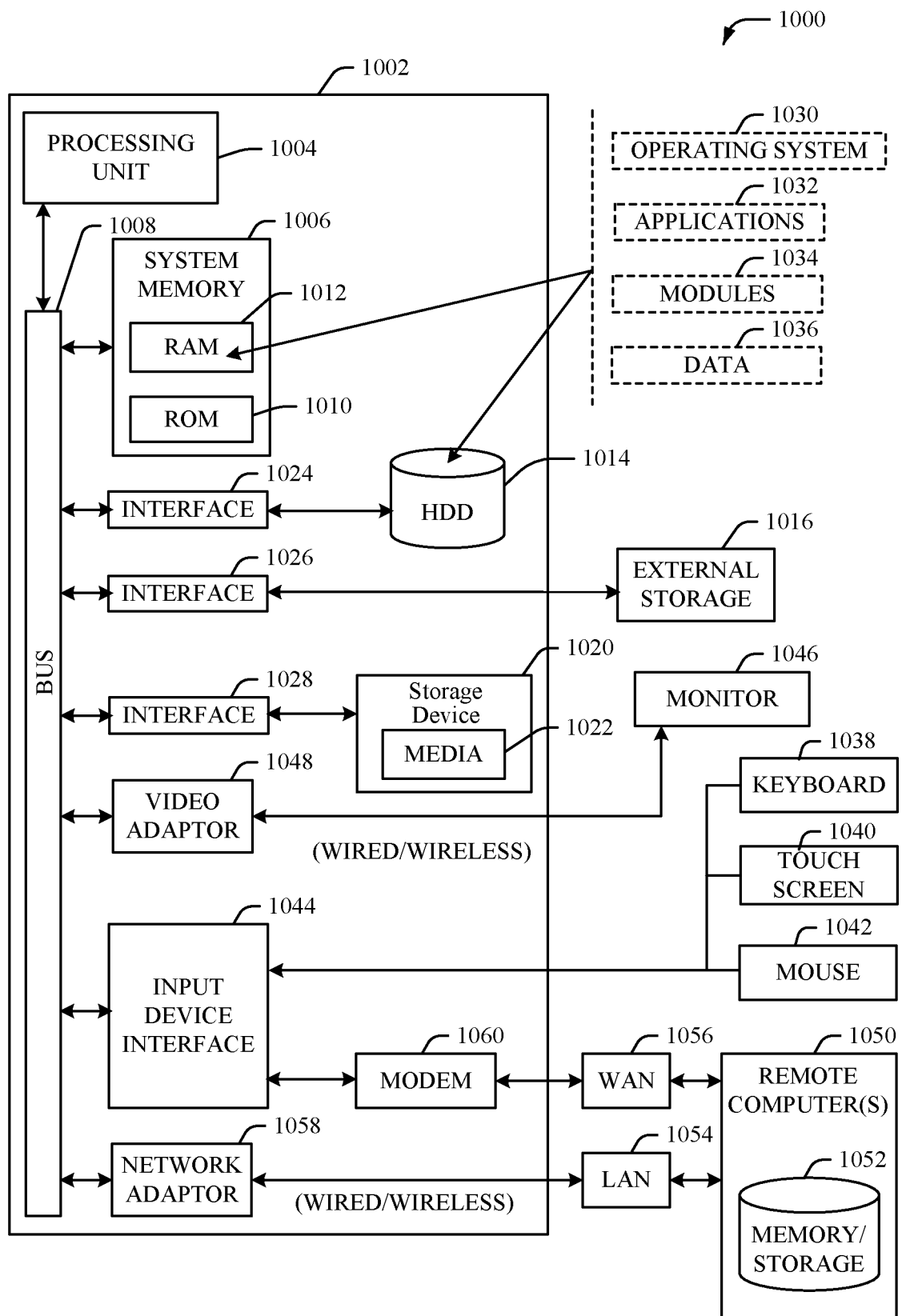
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile memory, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (virtual machine) of multiple virtual machines hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
determining a non-recoverable failure of a failed virtual machine of a node cluster comprising data; and
in response to the determining, replacing the failed virtual machine, comprising:
triggering a data protection job to restore reprotection of data that has reduced protection based on the failed virtual machine;
terminating the failed virtual machine to release resources attached to the failed virtual machine;
creating a replacement virtual machine that threshold matches characteristics of the failed virtual machine;
detecting that the replacement virtual machine has joined the node cluster and is merged to the node cluster;
detecting that the data protection job to restore the reprotection of the data is complete; and
triggering a rebalancing job to balance the data of the node cluster among virtual machines of the node cluster, the virtual machines comprising the replacement virtual machine.

2. The system of claim 1, wherein the terminating of the failed virtual machine and the creating of the replacement virtual machine comprises facilitating the terminating and the creating via cloud network equipment associated with a cloud provider.

3. The system of claim 1, wherein the operations further comprise queuing the data protection job prior to triggering the rebalancing job.

4. The system of claim 1, wherein the triggering of the data protection job occurs prior to the terminating of the failed virtual machine.

5. The system of claim 1, wherein the triggering of the rebalancing job occurs in response to the detecting that the replacement virtual machine is merged into the node cluster.

6. The system of claim 1, wherein the creating the replacement virtual machine that threshold matches the characteristics of the failed virtual machine comprises determining at least one of: a node pool to which the failed virtual machine belonged, or a fault domain to which the failed virtual machine belonged.

7. The system of claim 6, wherein the operations further comprise verifying that the replacement virtual machine belongs to the node pool and the fault domain of the failed virtual machine.

8. The system of claim 1, wherein the determining of the non-recoverable failure comprises detecting at least one of: a hardware failure of a device underlying the virtual machine, or a journal device failure.

9. The system of claim 1, wherein the replacing of the failed virtual machine is performed using an orchestration engine communicatively coupled to the node cluster.

10. The system of claim 1, wherein the determining of the non-recoverable failure of the failed virtual machine of the node cluster comprises obtaining data indicating the non-recoverable failure of the failed virtual machine corresponding to a health check of the node cluster.

11. The system of claim 1, wherein the creating of the replacement virtual machine comprises adding a serial number of the replacement virtual machine to a node cluster join queue.

12. The system of claim 1, wherein the operations further comprise obtaining cluster status data representative of a status of the node cluster, and wherein the obtaining of the cluster status data, the terminating of the failed virtual machine, and the creating of the replacement virtual machine are performed in parallel or substantially in parallel.

13. A method, comprising:
automating, by system comprising a processor, a replacement of a failed storage device in a clustered file system, the automating comprising:
restoring protection of data, having reduced protection based on the failed storage device, via remaining storage devices of the clustered file system;
terminating the failed storage device;
joining, to the clustered file system, a replacement storage device that matches characteristics of the failed storage device;
detecting that the replacement storage device is merged to the clustered file system; and
rebalancing data of the clustered file system.

14. The method of claim 13, wherein the rebalancing of the data of the clustered file system comprises queueing a rebalancing job, determining completion of the restoring of the protection of the data, and running the rebalancing job in response to the determining of the completion of the restoring of the protection.

15. The method of claim 13, wherein the automating further comprises creating the replacement storage device with characteristic data that matches characteristic data representative of at least one characteristic of the failed storage device.

16. The method of claim 13, wherein the automating further comprises determining a storage device pool of the clustered file system and a fault domain of the clustered file system to which the failed storage device belonged, and verifying that the replacement storage device is in the storage device pool and the fault domain.

17. The method of claim 13, wherein the automating comprises executing an orchestration engine, or executing a script to perform at least one of the restoring, the terminating, the joining, the detecting, or the rebalancing.

18. The method of claim 13, wherein the replacement storage device corresponds to a virtual machine, and wherein the joining of the replacement storage device comprises adding a serial number of the virtual machine to a storage device cluster join queue applicable to joining the clustered file system.

19. A non-transitory machine-readable medium, comprising executable instructions that, when executed by a processor, facilitate performance of operations, the operations comprising:
responsive to a failed virtual machine of a node cluster, replacing the failed virtual machine, the replacing comprising:
triggering a data restoring action to restore data protection of data with reduced protection as a result of the failed virtual machine to remaining nodes of the node cluster;
creating a replacement virtual machine that matches at least one characteristic of the failed virtual machine;
adding the replacement virtual machine to virtual machines of the node cluster, resulting in updated virtual machines of an updated node cluster;
determining that the data protection restoring action is complete; and in response to the determining, triggering a rebalancing action to balance data of the node cluster among the updated virtual machines of the updated node cluster.

20. The non-transitory machine-readable medium of claim 19, wherein the adding of the replacement virtual machine comprises taking an action to join the replacement virtual machine to the node cluster, resulting in the replacement virtual machine being merged to the node cluster.

* * * * *